United States Patent
Somfalvy

(10) Patent No.: US 8,358,140 B2
(45) Date of Patent: Jan. 22, 2013

(54) METHOD FOR TESTING THE FUNCTIONALITY OF A FIELD DEVICE FOR AN INDUSTRIAL PROCESS AND FIELD DEVICE FOR AN INDUSTRIAL PROCESS

(75) Inventor: Peter Somfalvy, Bruchkoebel (DE)

(73) Assignee: Samson Aktiengesellschaft, Frankfurt (DE)

( * ) Notice: Subject to any disclaimer, the term of this patent is extended or adjusted under 35 U.S.C. 154(b) by 253 days.

(21) Appl. No.: 12/538,939

(22) Filed: Aug. 11, 2009

(65) Prior Publication Data
US 2010/0033192 A1 Feb. 11, 2010

(30) Foreign Application Priority Data
Aug. 11, 2008 (DE) .......................... 10 2008 037 302

(51) Int. Cl.
*H01H 31/02* (2006.01)

(52) U.S. Cl. ... 324/555; 324/500; 324/537; 324/762.01; 324/762.06; 324/763.01; 137/487.5

(58) Field of Classification Search .............. 324/1–138, 324/555, 500, 537, 762.01, 762.06, 763.01; 137/487.5; 702/1, 33, 34, 57, 58, 108, 117, 702/118, 127, 182, 183
See application file for complete search history.

(56) References Cited

U.S. PATENT DOCUMENTS

| 5,654,885 A * | 8/1997 | Mayhew et al. .............. 700/282 |
| 7,275,533 B2 * | 10/2007 | Soeholm et al. .......... 126/299 R |
| 2007/0183901 A1* | 8/2007 | Chester et al. .................. 417/26 |

FOREIGN PATENT DOCUMENTS

| DE | 44 29 401 C2 | 2/1996 |
| DE | 10 2005 024 686 A1 | 12/2006 |
| WO | 2008085775 A1 | 7/2008 |

* cited by examiner

*Primary Examiner* — Jermele M Hollington
*Assistant Examiner* — Alesa Allgood
(74) *Attorney, Agent, or Firm* — Schiff Hardin LLP

(57) ABSTRACT

In a method for testing functionality of a field device or a field device for sending a control signal to a final controlling device of an industrial processing plant, the final controlling device is operated by a secondary power. With the method, a current/secondary power converter is provided for generating a predetermined secondary power safety control signal to bring the final controlling device into a predetermined safe position. An electronic safety circuit is provided connected to the current/secondary power converter which, depending on an electrical control signal received by the field device, is switched from a passive state into an active state in which the electronic safety circuit causes the current/secondary power converter to output the secondary output power safety control signal. The safety circuit automatically adopts the active state if the electrical control signal falls below or exceeds at least one of a current and a voltage threshold value specific to the safety circuit. At least one of an input current and an input voltage of the electrical control signal is modified in a manner specific to the field device such that a test signal specific to the safety circuit is generated and transmitted to the safety circuit in order to test its functionality.

32 Claims, 2 Drawing Sheets

METHOD FOR TESTING THE FUNCTIONALITY OF A FIELD DEVICE FOR AN INDUSTRIAL PROCESS AND FIELD DEVICE FOR AN INDUSTRIAL PROCESS

BACKGROUND

The preferred embodiment relates to a method for testing the functionality of a field device for an industrial process as well as to a field device for an industrial process.

A field device for an industrial process is to be understood as a control device which sends control signals to a final controlling device of an industrial processing plant. A final controlling device can for example be comprised of an actuator and a control valve actuated by the actuator, the control valve being often used for controlling a stream of a fluid in an industrial processing plant. Due to strict safety regulations, especially in chemical processing technology such as petrochemical technology, or in power technology such as nuclear technology, it is to be assured that the final controlling device moves the control valve into a safe position causing the control valve for example to completely open or closed in order to react to an emergency situation of the plant. Generally the final controlling device is operated by means of a secondary power such as electricity, or hydraulic or pneumatic energy.

The preferred embodiment concerns especially a field device for an industrial process designed as a positioner or position controller for sending an electrical control signal to a final controlling device comprised of a pneumatic actuator and a control valve positionable by means of the actuator.

The safe position the device is supposed to adopt in case of failure of the secondary power or reception of a certain safety control signal, is realized by means of the pressure of preloaded springs in the case of a pneumatic actuator connectable to a constant air pressure supply of for example 6 bar as a secondary power supply. The springs release their potential energy as soon as the pneumatic actuator is separated from the air pressure supply by the field device and is vented. In this case venting the pneumatic actuator corresponds to the pneumatic safety control signal sent by the field device to the pneumatic actuator.

In a simplified embodiment, a field device used for sending control signals to a pneumatically operated final controlling device can be an I/P converter which usually generates standardized pneumatic output signals between 0.2 to 1 bar or 0.4 to 2 bar as a function of the received electrical control signal for controlling the pneumatic actuator correspondingly. For adopting the safe position for pneumatic actuators it is necessary to vent the latter, which means to lower the output signal of the I/P converter to nearly 0. Commonly, this will occur when the I/P converter receives an electrical zero-signal or at least a signal below a specific threshold value.

A field device designed as a position controller having a pneumatic actuator is known from DE 44 29 401 C2. The field device comprises an I/P converter as a so-called pre-control step. A safety circuit formed by a relay is provided between an electrical circuit of the position controller and the I/P converter along the electrical control path and interrupts an electrical control line to the I/P converter in case of an operational error. In this way, the I/P converter adopts the operational safety state and vents the pneumatic actuator. The electrical circuit of the position controller is continuously supplied with power through a standardized 4 to 20 mA control signal according to the so-called "Live-Zero"-principle. Thus, the pneumatic actuator can be vented by means of the relay safety circuit even while the position controller receives a set-point signal significantly higher than 4 mA. An electric power supply for the electrical circuit of the position controller is always guaranteed, even if the field device is commanding the safe position be means of venting.

DE 10 2005 024 686 A1 describes a position controller with an electrically operable safety switch immediately preceding the I/P converter. The function of the safety switch is to enable a safe withdrawal of power from the I/P converter. Preferably, the safety switch is comprised of high reliability electronic components and receives the input signal from the position controller. If the voltage or current of the input signal is above a predetermined value such as 4.5 mA or 4 mA then the I/P converter receives a control signal from the micro processor of the position controller. If the voltage or current of the input signal drops below the predetermined value, the power input of the I/P converter will be cut by the safety switch, which will cause the pneumatic actuator to vent.

The established structure for a position controller according to DE 10 2005 024 686 has the advantage to enable safety certification relatively simply. From a safety technological aspect, the position controller is reduced to the safety switch, which is composed of reliable and easily verifiable electronic components. A certification of a microprocessor for the position controller would be much more difficult, because the failure probability of a microprocessor depends on many operational circumstances.

SUMMARY

An object is to improve a method for testing functionality of a field device for an industrial process and a field device for an industrial process in such a way that an improved diagnosis of components of the field device and thus a simpler certification becomes possible.

In a method for testing functionality of a field device or a field device for sending a control signal to a final controlling device of an industrial processing plant, the final controlling device is operated by a secondary power. With the method, a current/secondary power converter is provided for generating a predetermined secondary power safety control signal to bring the final controlling device into a predetermined safe position. An electronic safety circuit is provided connected to the current/secondary power converter which, depending on an electrical control signal received by the field device, is switched from a passive state into an active state in which the electronic safety circuit causes the current/secondary power converter to output the secondary output power safety control signal. The safety circuit automatically adopts the active state if the electrical control signal falls below or exceeds at least one of a current and a voltage threshold value specific to the safety circuit. At least one of an input current and an input voltage of the electrical control signal is modified in a manner specific to the field device such that a test signal specific to the safety circuit is generated and transmitted to the safety circuit in order to test its functionality.

DESCRIPTION OF THE PREFERRED EMBODIMENTS

Figure 1:
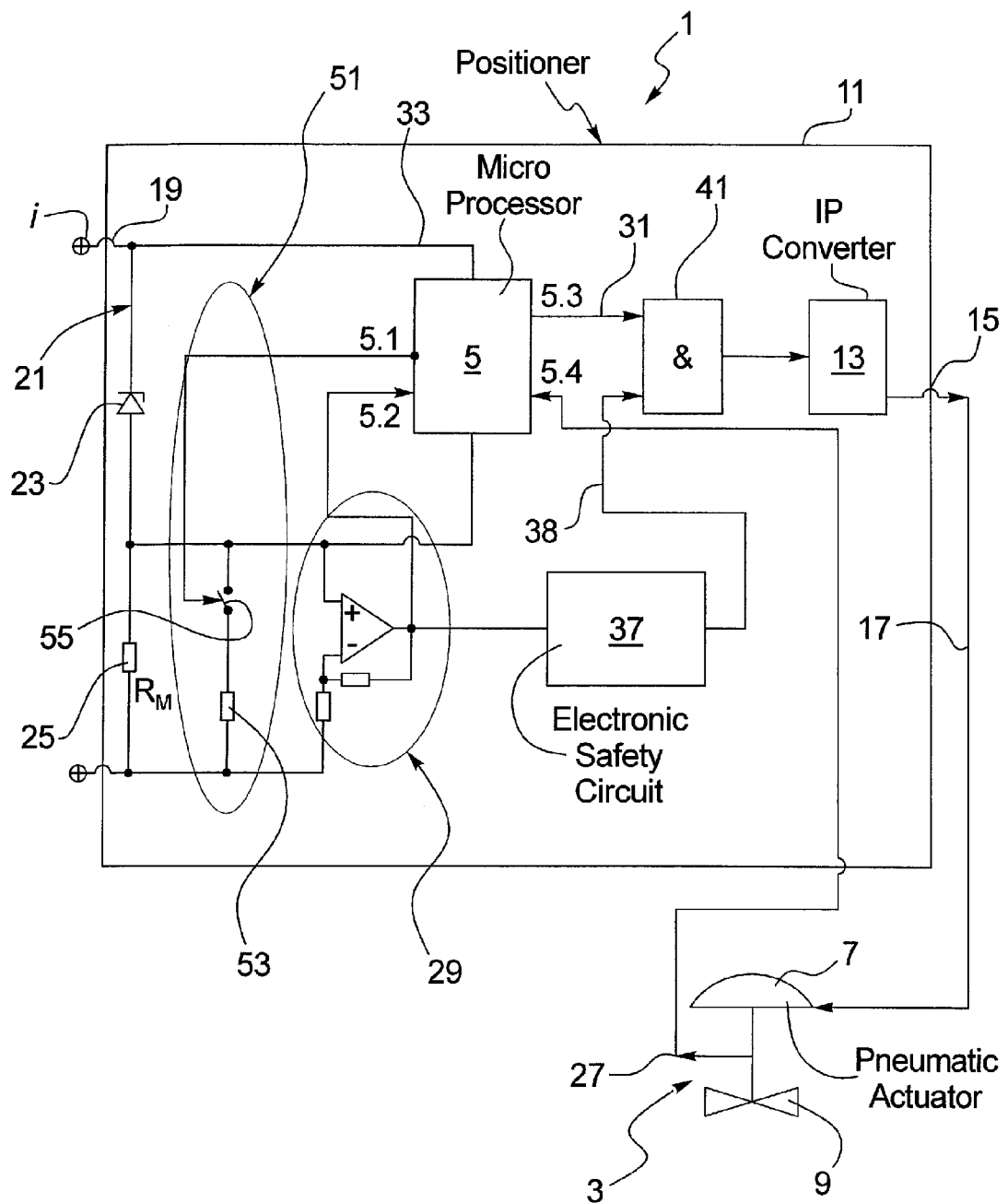
FIG. 1 shows a block diagram of an electronic switch circuit of the field device according to the preferred embodiment.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Accordingly, a method for testing the functionality of a field device for an industrial process as well as a field device for an industrial process is provided that controls a final controlling device of an industrial processing plant, operated by means of a secondary power supply. For industrial processing plants in explosive environments, final controlling devices can be designed as ignition safe. Actuators are often chosen from pneumatic actuators, which in a simple manner guarantee adoption of a safe position by means of a spring reservoir and also do not cause danger of explosion. Such an actuator mechanically moves the control valve. The field device according to the preferred embodiment has a converter of current to secondary power, such as an I/P converter, which can produce a predetermined secondary power safety control signal in order to move the final controlling device into a predetermined safe position. For an I/P converter, the secondary power safety control signal is the venting of the pneumatic actuator by the I/P converter, i.e. a venting signal or a pneumatic zero-signal. Thus, a secondary power positioning signal for pneumatic actuators is the signal sent to the pneumatic actuator by the I/P converter for moving the control valve.

Furthermore, the field device according to the preferred embodiment comprises an electrical safety circuit connected upstream the current/secondary power converter. The safety circuit can be switched from a passive state into an active state depending on an electrical control signal received by the field device whereby the electrical safety circuit causes the current/secondary power converter to issue the secondary power safety control signal. Usually, the electrical control signal is produced by a basic process control system superordinate to the final controlling device. In the passive state, the safety circuit preferably transmits the control signal unchanged to the current/secondary power converter, which issues a corresponding secondary power control signal to the final controlling device. According to the preferred embodiment, the safety circuit will automatically adopt the active state if the electrical control signal falls below or exceeds a current and/or voltage threshold value specific to the safety circuit. For example, the safety circuit can be designed as a relay.

According to the preferred embodiment, an electrical signal issued to the safety circuit shall be modified in a field device specific manner after it has been received by the final controlling device. For this purpose, according to the preferred embodiment, an additional electronic test circuit is built into the field device in such a way that a circuit modifies the electrical control signal to be transferred to the safety circuit in a way specific to the safety circuit. Thereby, a field device specific test signal is provided especially for the safety circuit.

The received control signal, which can also be destined for other electronic components within the final controlling device, such as a microprocessor, shall remain unchanged for those components even though being modified for the safety circuit. The safety circuit and the components of the field device affected by it can be tested by means of the test signal specific to the safety circuit.

The teaching according to the preferred embodiment is based on the finding that the known structure of field devices having a safety circuit dedicated to the current/secondary power converter enables a simple certification because the probability of failure of the field device is reduced due to the separation of the emergency positioning function of the field device from the microprocessor to a safety circuit and the resulting simplicity of the components of the safety circuit. It became apparent that for position controllers with secondary power signal generation via microprocessor certification is difficult to achieve and only with high expenditure concerning the testing, because the reasons for failure of the microprocessor are complex. With the additional field device specific electronic test circuit according to the preferred embodiment, which is directly related to the safety circuit and which allows testing the functionality of the safety circuit for an unlimited number of times, the expenditure for certification is reduced significantly, whereby the failure probability can be more reliably determined and also be reduced. The safety circuit specific transformation of the electrical control signal received at the field device by the test circuit for generating a test signal enables to leave unchanged the same control signal for other electronic components of the position controller. Thereby, the power supply for those electronic components is available for diagnosing purposes despite functional diagnosis of the current/secondary power converter concurrently being proceeded by switching it to 0-current.

In a preferred embodiment, the electronic control signal received at the field device is transferred to the electrical safety circuit as well as to at least one further electronic component of the field device, especially a microprocessor. This can be realized for example by means of a respective parallel circuit. Accordingly, an electrical control signal received at the field device input can be copied into two identical signals whereby only the signal destined for the electrical safety circuit is transformed for forming a test signal. The electrical control signal destined for the at least one further electronic component remains unchanged.

In a further embodiment, a controllable range of change of the input current and/or input voltage of the test signal is predefined especially manually or by means of a microprocessor. Thereby, the range of change is adjusted in steps or stepless. In this way, it is possible to progressively approach a safety circuit specific current and/or voltage threshold value in order to determine the operational moment when the safety circuit responds and transits into the active test state.

In a preferred embodiment, the method is initiated in a field device specific way for example manually and/or via a basic process control unit superordinate to the filed device. However, the time order of the method is determined by a microprocessor of the field device. The microprocessor sets when and/or within which range the received control signal will be transformed. In this way, different test signals can be generated field device specifically.

In a preferred embodiment, a value of the modified input current and/or input voltage of the test signal is measured at the safety circuit and transferred in particular to a microprocessor of the field device. In this way at any period of operation of the industrial processing plant it can be determined which test signals were transferred to the safety circuit. In this way it is possible to execute an extensive diagnosis of the functionality of the safety circuit.

In a further embodiment, a value of the modified input current and/or input voltage of the test signal is measured and determined at the safety circuit. This value is transferred to a microprocessor of the field device for archiving and further processing. Thereby, it can be determined whether and/or from which value onwards of the input current and/or input voltage the final controlling device will move into the safe position, and especially when the secondary power safety control signal is generated by the current/secondary power converter. Preferably, the determined value is compared to the safety circuit specific threshold value of the current and/or voltage.

Alternatively, the value of the input current or voltage leading to retreat from the safe position, respectively to the return to normal operation, can be determined by concurrently measuring the input current value of the safety circuit and monitoring the safe position of the final controlling device, thereby observing the switching points of the safety circuit. A change of these switching points is a measure for a changed functionality of the safety circuit.

In a further embodiment, a warning signal is generated when the measured value of the input current and/or input voltage at the safety switch is outside a predetermined tolerance field, which for example can be programmed into the memory of the microprocessor. A warning signal can also be generated with the input current and/or input voltage at the safety circuit falls below or exceeds a predetermined threshold value without the final controlling device having moved into the safe position, in particular the secondary power safety control signal having been generated.

In a specific embodiment, the safety circuit specific current threshold value is approximately 4 mA. When the method is initiated, the electrical control signal present at the field device input larger than 4 mA is in particular continuously lowered prior to its reception by the safety circuit to a value of about 4 mA or less by the test circuit.

In a further embodiment, the electrical safety circuit transmits in its active state a predetermined "Live-Zero"-Signal of about 0.0 to about 4 mA to an I/P converter. Upon receiving the Live-zero-signal, the I/P converter vents the pneumatic actuator of the final controlling device whereupon the final controlling device is forced into the safe position through release of potential spring energy.

Further, the preferred embodiment relates to a field device for an industrial process, such as a positioner for sending a control signal to a final controlling device driven by a secondary power such as pneumatic energy. The field device for an industrial process comprises an input for receiving an electrical control signal such as a live-zero-signal. Furthermore, the field device has an output for transmitting the secondary power output signal for controlling the final controlling device. The physical structures of the input and the output can be designed as openings in a closed or closable housing of the positioner. The secondary power output signal, for example a pneumatic output signal in the case of a pneumatically driven final controlling device serves for positioning an actuator of the final controlling device. In an emergency situation, the field device transmits a predetermined secondary power safety control signal to the final controlling device. Furthermore, the field device has a current/secondary power converter, such as an I/P converter, generating the secondary power signal depending on an electrical control signal. The control signal is usually transmitted from a superordinate basic process control unit to a field device and to the current/secondary power converter which converts the electrical signal into a secondary power output signal.

Furthermore, the field device has a safety circuit disposed between the input and the current/secondary power converter. The safety circuit can be shifted into a passive state and into an active state depending on the electrical control signal received by the field device. In the active state the safety circuit causes the current/secondary power converter to generate the secondary power safety control signal. In the active state, other signals cannot be transmitted from the current/secondary power converter to the final controlling device. The safety circuit is automatically switched to the active state for exclusively transmitting the secondary power safety control signal, when the electrical control signal falls below or exceeds a current or voltage threshold value specific to the safety circuit. In most applications of pneumatically operated final controlling devices, the current threshold value is 4 mA. Finally, the field device has a controllable electrical circuit for testing the functionality of the field device downstream the input and upstream the electrical safety circuit. The electronic test circuit can be switched from a passive rest state to an active test state. In the passive state, the electronic test circuit will not affect the functionality of the field device. However, in the active state, the electronic test circuit modifies the electrical control signal received at the field device to be passed on to the safety circuit in order to generate an electrical test signal of predetermined and/or pre-determinable current and/or voltage. The electrical test signal is destined exclusively for the safety circuit and is transmitted thereto.

In a preferred embodiment, the field device has a microprocessor as an intelligent electronic component of the field device. Within the field device, the microprocessor is electronically coupled with the input of the filed device in such a way that the electrical control signal remains unchanged with respect to supplying power to the microprocessor even while the electronic test circuit is switched into the test state. This implies that control signals destined for the microprocessor remain basically unchanged with respect to their energy level and data content even in the test state. The same electrical control signal destined for the safety circuit is modified.

In a preferred embodiment, the electronic test circuit is controlled by the microprocessor of the field device with respect to its switching into the test state and/or back into the rest state. Evidently, the switching can also be manually initiated by an operating person, especially from the outside of a housing of the field device, preferably by manually actuating an external operating element, such as a knob. It is also conceivable to conduct the switching process of the electronic test circuit fully automatically through the microprocessor having a clocked routine which automatically initiates the switching process according to predetermined cycles.

In a preferred embodiment, the electronic test circuit in its test state adjustably lowers the current transmitted to the electrical safety circuit. If for example a normal operational control signal is transmitted to the final controlling device from the basic process control unit having a current value of 9 mA, the control signal of 9 mA will be lowered upon initiation of the test procedure. If the threshold value specific for the safety circuit is 4 mA then preferably the electronic test circuit is designed such that the 9 mA driving signal is lowered to about 4 mA or slightly above or slightly below in order to test whether and from which value onwards the safety operation is initiated at the final controlling device by means of the field device.

In a preferred embodiment, the electronic test circuit has an especially continuously variable resistance, especially a current limiting resistance and/or a semi-conductor element, especially a field effect transistor. Preferably, the electronic test circuit has a switch for switching between the test state and the rest state connected in line with the resistance and/or the semi-conductor element.

In a preferred embodiment, the field device has a current input loop line disposed between the input and the output, to which the electrical control signal, especially from 4 to 20 mA is transmitted from the basic process control unit. The electronic test circuit is disposed in an electric line, which in the test state is switched in parallel to the current input loop line. Preferably, the current input loop line contains a resistance and a voltage limiting diode such as a Zener diode. The voltage limiting diode has the function to reduce the voltage and thus enable a low power load.

In a further embodiment, a measurement instrument is provided within the field device, which captures the test signal generated in the test state. The measurement instrument is electronically coupled with a microprocessor of the field device in order to transmit the captured test signals. The microprocessor stores the captured test signals and/or evaluates them for diagnosis of functionality of the field device if appropriate. The microprocessor can also transmit the captured test signals to the superordinate basic process control unit for further processing. The measurement instrument is preferably a current measurement circuit which in particular is switched in parallel to the electronic test circuit and preferably has an operational amplifier. Self-evidently, the current measurement circuit shall not influence the test signal generated by the electronic test circuit.

In a further embodiment, the field device has a control valve position sensor, the position signals of which are received by the microprocessor of the field device. The microprocessor can have a monitoring program which monitors the functionality of the electrical safety circuit with respect to whether and/or from which test signal onwards the electrical safety circuit responds. Alternatively to the comparison with known threshold values for controlling the I/P converter or the capturing of the position of the final controlling device, the correct functioning of the safety circuit can be judged on the basis of monitoring the positioning signal sent to the actuator.

In a preferred embodiment, the field device has an AND logic component which is connected at its input to the output of the microprocessor as well as to the output of the electrical safety circuit. The AND logic component is designed to output an electric safety control signal for moving the final controlling device towards the safe position only if a current and/or voltage at the output of the microprocessor and/or the safety circuit falls below or exceeds a logic specific threshold value, especially if a current value of about 0.0 mA is present. This means that if the AND logic component receives an emergency signal either from the safety circuit or from the microprocessor, the logic component in both cases switches the current/secondary power converter in such a way that a secondary power safety control signal is generated. The AND logic component provides a high reliability of the functionality of the field device and thus a simple certification.

In a further development, at least one electronic component, such as a microprocessor, a data storage device, a signal measurement device, a sensing device, etc. of the field device is powered exclusively via the received electrical control signal.

In a further development, the current/secondary power converter, the electrical safety circuit and the electronic test circuit, preferably also the microprocessor and the further electronic components, are disposed in an enclosed positioner housing.

It is to be understood that the field device can operate according to the method steps of the test procedure of the preferred embodiment.

Further characteristics, advantages and features will become apparent from the following description of a preferred embodiment in conjunction with the enclosed drawings.

In FIG. 1 the field device for an industrial process of the preferred embodiment is designed as a positioner and generally denoted with the reference numeral 1. The positioner 1 is used for actuating a pneumatically operated final controlling device 3 which comprises a pneumatic actuator 7 and a control valve 9, positionable through the pneumatic actuator 7, which can influence a stream of a fluid in a processing plant not shown in FIG. 1.

The positioner 1 comprises a fluid-tightly enclosed positioner housing 11, in which all components of the positioner 1 are stored.

The positioner 1 has as main functional components a microprocessor 5 and an I/P converter 13, which is connected to the pneumatic actuator 7 via a positioner output 15 and via a pneumatic line 17.

The positioner 1 comprises an input 19 through which the positioner 1 receives a control signal i with a current level of 4 to 20 mA. Depending on the deviation of the control variable, i.e. the position of the control valve, from the set-point value, the microprocessor generates a positioning signal, which is transformed into gas pressure by the I/P converter, whereby the pneumatic actuator 7 and thereby the control valve 9 is moved correspondingly.

When an emergency state of the industrial processing plant occurs, the transmission of the control signal i can be disturbed, so that the positioner input 19 is switched to 0-current. Thereby, the microprocessor 5 is also without current, so that via the microprocessor output 5.3 also the I/P converter is currentless. Thereupon, the pneumatic actuator 7 is vented and the potential energy stored in the compressive springs (not shown) is released and the control valve is moved into a predetermined emergency position. It is of particular importance to assure the functionality of this emergency procedure with a high degree of probability.

At the input 19 of the positioner 1 there is provided a current input loop line 21, into which the control signal i is fed. At least one Zener diode 23 and a shunt resister 25 switched in line thereto are disposed in the current input loop line 21 for limiting the voltage. Self-evidently, alternatively to the Zener diode 23, also an electronic voltage limiter can be used for limiting the voltage. Via the voltage drop caused by the shunt resistor 25, a current measurement device 29 measures the current at the current loop, which represents a set-point value for the valve position. The set-point value is fed to the microprocessor 5 via the microprocessor input 5.2 and is stored therein. Via a routine, the microprocessor 5 generates an output signal 31 which is transmitted to the I/P converter 13 via the microprocessor output 5.3. The output signal 33 can further depend on other control conditions the microprocessor 5 receives for example via a digital protocol such as HART, via the line 33 or in some other way. The other control conditions can also be stored previously as a routine in the microprocessor 5.

The field device 1 comprises an electronic safety circuit 37 which below a threshold value for the electrical current (for example 4 mA) at the input loop line 21 transmits an electrical safety control signal to the I/P converter 13, which causes the I/P converter 13 to vent the pneumatic actuator 7. Preferably, the electronic safety circuit 37 switches the I/P converter 13 to 0-current if the current at the input loop line is below the threshold value. The electronic safety circuit 37 provides for safely switching off the field device 1, whereby the remaining field device components (except the I/P converter 13), such as the microprocessor 5, communication devices and possible diagnosing components are further on provided with energy.

An AND logic component 41 is connected with its input to the microprocessor output 5.3 as well to the output of the electronic safety circuit 37. The output of the AND logic component 41 is directly coupled to the I/P converter 13. The AND logic component lets an electrical positioning signal 39 pass through the I/P converter only if neither the output signal 31 of the microprocessor 5 nor the electrical safety control signal 38 of the electrical safety circuitry sends a 0-current signal or a current below a threshold value to the I/P converter 13. The AND logic component 41 can be comprised of two FETs switched in line.

The microprocessor 5 comprises a further input 5.4, via which position signals 27 of a position sensor at the control valve 9 are fed back to the microprocessor for a control or diagnosing procedure.

According to the preferred embodiment, the positioner 1 comprises within its housing an electronic test circuit 51 featuring a variable resistance 53. The resistance 53 can be realized as a passive component but also actively by means of semi-conductor elements.

A functionality test procedure according to the preferred embodiment can be initiated by the microprocessor 5 by sending a control signal to an on-off-switch 55 of the electronic test circuit 53 via an output 5.1. As soon as the microprocessor 5 closes the switch 55 a portion of the current arriving in the input loop line 21 will flow via the resistance 53. This results in a drop of electric power across the shunt resistor 25, whereby the current fed to the electronic safety circuit 37 is also lowered. The amount of current reduction can be adjusted through the variable resistance 53. If the input current at the electronic safety circuit 37 falls below a threshold value specific to the safety circuit, the electronic safety circuit 37 will cause the I/P converter 13 to receive 0-current.

Thereby, the I/P converter 13 is set to the emergency state and vents the pneumatic actuator 7 which is communicated to the microprocessor 5 via the position sensor. In one embodiment, the microprocessor 5 tests whether in fact the safe position of the control valve 9 was reached. Alternatively, the input signal of the I/P converter is monitored, whereby the signal falling below a specific input value signifies a safe switching off. Subsequently, the switch 55 is opened via the output 5.1 of the microprocessor 5 whereby the test procedure is concluded.

In an improved embodiment of the electronic test circuit 51 (not shown), the resistance 25 is continuously variable. This means that the input current at the electronic safety circuit 37 is continuously lowered in order to establish from which current value onwards the electronic safety circuit 37 in fact sends the safety control signal 38 to the I/P converter 13. If here the deviation with respect to the threshold value specific to the safety circuit is too large, then the positioner 1 according to the preferred embodiment can issue a warning signal.

It is to be clear that the positioner 1 according to the preferred embodiment can display diagnosis information directly at the positioner 1, for example on an LCD-display. Alternatively or additionally, the diagnosis information can be transmitted to the basic process control unit via digital communication (HART, ZigBee, Blue Tooth).

A diagnosing procedure can be executed by the microprocessor 5, which can compare stored characteristic data with the data captured by the measurement instrument 29 and the position sensor. It is to be clear that the resistor 53 of the electronic test circuit 51 can also be changed in a backward direction, so that the control valve 9 moves back from its safe position. Just like for the switching off procedure, the data is compared to characteristic data of the microprocessor 5 in order to verify a correct functioning especially of the electronic safety circuit 37.

In this way, a specific safe position of the positioner 1 can be achieved in a simple way because on the one hand the safe position can be monitored via an electronic test circuit 51 inside the positioner and on the other hand the components relevant for safety are simple electronic components.

In an embodiment not shown in the figures, the electronic test circuit 51 can be formed by semiconductor elements such as a field effect transistor (FET). Alternatively, a circuit comprised of a passive resistance and a diode switched in series can be provided. The resistor serves as a current limiter while the diode in a technologically simple way avoids fault currents and assures that in case of malfunctioning of the electronic test circuit 51 an error can occur only in such a way that the safety circuit 37 is activated and the I/P converter 13 is switched to 0-current.

Figure 2:
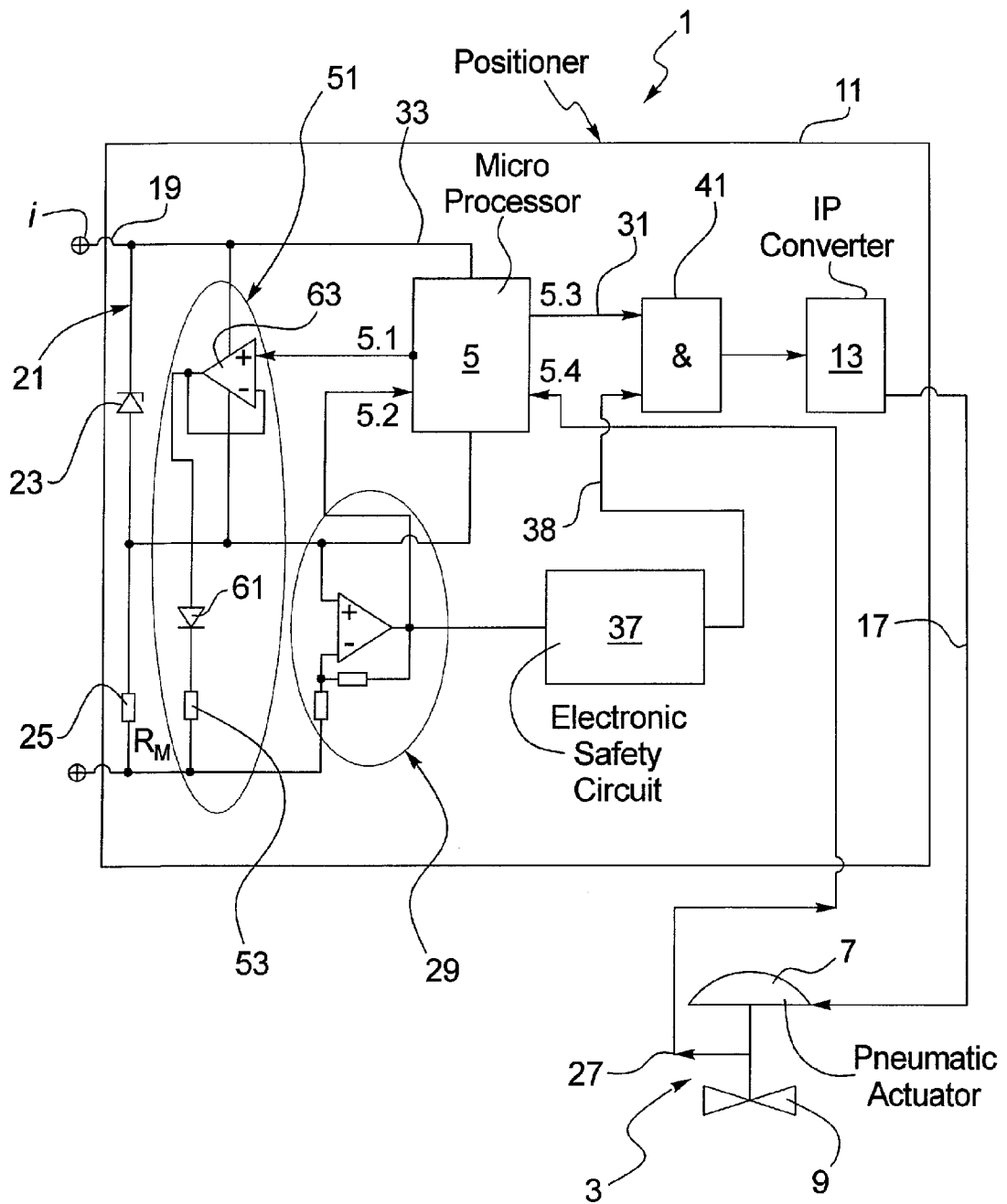
FIG. 2 shows a switch circuit block diagram of a further embodiment of the field device.

An alternative embodiment of the field device is shown in FIG. 2. For easier readability of the figure description, the same reference numerals are used for identical or similar components. The embodiment according to FIG. 2 differs from the one shown in FIG. 1 in that instead of the switch 55 a diode 61 is connected in line before current limiting resistor 53, whereby the current for initiating and switching off can be varied. The output 5.1 of the microprocessor 5 does not directly control the current but controls an operational amplifier 63 which modifies the current of the electronic test circuit 51. In analogy to the embodiment shown in FIG. 1, the electronic test circuit 51 shown in FIG. 2 represents a controllable current sink which achieves a targeted switching off and switching on of the I/P converter 13.

In a preferred method of functionality testing with respect to whether the control valve 9 has adopted a correct safe position, as a first step a defined set-point value (4 mA) is fed to a dual conductor device at the positioner 1. Thereby, the calibration of stored characteristic data can be verified in a first step, whereby the precision of the functionality test can be improved significantly. Subsequently, the functionality of the electrical safety circuit is tested by means of the electronic test circuit 51.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

I claim as my invention:

1. A method for testing functionality of a field device for sending a predetermined secondary power safety control signal to a final controlling device of an industrial processing plant, the final controlling device being operated by a secondary power, comprising the steps of:

providing a current/secondary power converter for generating said predetermined secondary power safety control signal to bring the final controlling device into a predetermined safe position;

providing an electronic safety circuit connected in front of and to the current/secondary power converter, and which, depending on an electrical control signal received by the field device, is switched from a passive state into an active state in which the electronic safety circuit causes the current/secondary power converter to output the predetermined secondary power safety control signal;

automatically adopting the active state by the safety circuit if the electrical control signal falls below or exceeds at least one of a current and a voltage threshold value specific to the safety circuit; and by use of an electronic test circuit, receiving a test control signal initiated manually or automatically when a test is desired and modifying at least one of an input current and an input voltage of the electrical control signal in a manner specific to the field device such that a test signal initiated by said test control signal and specific to the safety circuit is generated by the test circuit and transmitted to the safety circuit in order to test its functionality.

2. A method of claim 1 wherein said field device comprises a positioner.

3. A method of claim 1 wherein said secondary power comprises pneumatic power.

4. A method according to claim 1 wherein the electrical control signal received by the field device is transmitted to the electrical safety circuit as well as to at least one further electronic component of the field device wherein only the electrical control signal transmitted to the electrical safety circuit is modified to create said test signal for said functionality testing without modifying the electrical control signal transmitted to the at least one further electronic component.

5. A method according to claim 1 wherein a controllable range of said modification of at least one of the input current and the input voltage of the electrical control signal for generation of said test signal is adjusted.

6. A method according to claim 1 wherein in a way specific to the field device a time order of the method is controlled by a microprocessor of the field device.

7. A method according to claim 1 wherein a value of the test signal is measured at the safety circuit and transferred to a microprocessor of the field device.

8. A method according to claim 1 wherein it is determined whether or from which value onwards of the test signal to the safety circuit the final controlling device will move into the safe position, and the determined value is compared to at least one of the current and the voltage threshold value specific to the safety circuit.

9. A method according to claim 1 wherein a response threshold of the test signal present at the safety circuit is unchangeably determined by sensing the predetermined secondary power safety control signal at the output of at least one of the current/secondary power converter and/or the safe position of the final controlling device.

10. A method according to claim 1 wherein a warning signal is generated when a measured value of the test signal at the safety switch is outside of at least one of a predetermined tolerance field and falls below or exceeds a predetermined threshold value without the final controlling device having moved into the safe position.

11. A method according to claim 1 wherein the current threshold value specific to the safety circuit is approximately 4 mA, and upon initiation of the method, when the electrical control signal present at the field device input is larger than 4 mA a current of the electrical control signal is continuously lowered by the test circuit prior to its reception by the safety circuit to a value of about 4 mA or less.

12. A method according to claim 1 wherein said current/secondary power converter comprises an IP converter, and wherein the electrical safety circuit transmits in its active state a predetermined live zero signal of about 0.0 to about 4 mA to said I/P converter which upon receiving the live zero signal vents a pneumatic actuator of the final controlling device whereupon the final controlling device is forced into the safe position through release of potential spring energy.

13. A field device for an industrial process for sending a predetermined secondary power safety control signal to a final controlling device driven by a secondary power which, upon reception of said secondary power safety control signal, moves into a predetermined safe position, comprising:

an input for receiving an electrical control signal;

an output for transmitting the secondary power safety control signal for controlling the final controlling device;

a current/secondary power converter generating the secondary power safety control signal which depends on said electrical control signal;

an electronic safety circuit disposed between the input and the current/secondary power converter, said safety circuit, depending on the electrical control signal received by the field device being shiftable into a passive state and into an active state in which the safety circuit causes the current/secondary power converter to generate said secondary power safety control signal, the safety circuit being automatically switched to the active state when the electrical control signal falls below or exceeds at least one of a current and voltage threshold value specific to the safety circuit; and the field device having downstream from the input and upstream from the electrical safety circuit a controllable electronic test circuit specific to the field device for testing a functionality of the field device, and wherein the electronic test circuit being switchable from a passive rest state to an active test state when a test control signal initiated manually or automatically is received when a test is desired and wherein the electronic test circuit modifies the electrical control signal received at the field device and transmits on the modified electrical control signal as an electrical test signal initiated by said test control signal of predeterminable at least one of current and voltage to the electrical safety circuit.

14. A field device of claim 13 wherein the field device comprises a positioner.

15. A field device of claim 13 wherein said secondary power comprises pneumatic energy.

16. A field device of claim 13 wherein said secondary power safety control signal comprises a venting signal.

17. A field device of claim 13 wherein said electrical control signal comprises a live zero signal.

18. A field device of claim 13 wherein said current/secondary power converter comprises an I/P converter.

19. A field device according to claim 13 wherein it has a microprocessor electronically coupled with the input of the field device in such a way that the electrical control signal remains essentially unchanged with respect to supplying power to the microprocessor even while the electronic test circuit is switched into the active test state.

20. A field device according to claim 13 wherein the electronic test circuit receives a switching control signal from the microprocessor for switching the test circuit into at least one of the active test state and the passive rest state.

21. A field device according to claim 13 wherein the electronic test circuit is switchable manually by an operating person into at least one of the active test state and the passive rest state.

22. A field device according to claim 13 wherein when the electronic test circuit is in its active test state it adjustably lowers the predeterminable current transmitted to the electrical safety circuit.

23. A field device according to claim 13 wherein the final controlling device has a position sensor, position signals of which are received by a microprocessor of the field device which monitors the electrical safety circuit.

24. A field device according to claim 13 wherein the field device has an AND logic component connected at its input to an output of a microprocessor as well as to an output of the electrical safety circuit and is designed to output an electric safety control signal for moving the final controlling device towards the safe position only if at least one of a current and a voltage at the output of at least one of the microprocessor and the safety circuit falls below or exceeds a logic specific threshold value.

25. A field device according to claims 13 wherein at least one electronic component of the field device is powered exclusively via the electrical control signal.

26. A field device according to claim 13 wherein the current/secondary power converter, the electrical safety circuit, and the electronic test circuit are disposed in an enclosed positioner housing.

27. A field device according to claim 13 wherein the electronic test circuit has a continuously variable resistance.

28. A field device according to claim 27 wherein the electronic test circuit has a switch for switching between the active test state and the passive rest state connected in line with at least one of the variable resistance and a semiconductor element.

29. A field device according to claim 13 wherein the field device has a current input loop line disposed between the input to which the electrical control signal is fed and the electronic test circuit, and which in the active test state is switched in parallel to a portion of the current input loop line.

30. A field device according to claim 29 wherein the current input loop line comprises a resistance and a voltage limiting diode.

31. A field device according to claim 13 wherein a measurement instrument captures the test signal and connects the test signal to a microprocessor of the field device for transmission to the converter.

32. A field device according to claim 31 wherein the measurement instrument comprises a current measurement circuit.

* * * * *